United States Patent [19]
Yamamoto et al.

[11] Patent Number: 6,105,302
[45] Date of Patent: *Aug. 22, 2000

[54] FISHING ROD HAVING IMPROVED GRIPPING PORTION

[75] Inventors: Shigeru Yamamoto, Saitama; Teiji Matsubara, Chiba; Mitsuyoshi Oyama, Tokyo, all of Japan

[73] Assignee: Daiwa Seiko, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,827

[22] Filed: Dec. 27, 1996

[30] Foreign Application Priority Data

Dec. 27, 1995 [JP] Japan ................................. 7-341355
Jan. 31, 1996 [JP] Japan ................................. 8-015386

[51] Int. Cl.⁷ ...................................................... A01K 87/08
[52] U.S. Cl. ................................................................. 43/23
[58] Field of Search .................................... 43/23; D22/142

[56] References Cited

U.S. PATENT DOCUMENTS

| | | | |
|---|---|---|---|
| D. 156,360 | 12/1949 | McGuire | D22/142 |
| D. 194,979 | 4/1963 | Elsby | D22/142 |
| D. 299,514 | 1/1989 | Andreasen et al. | D22/142 |
| D. 300,167 | 3/1989 | Andreasen et al. | D22/142 |
| D. 314,605 | 2/1991 | Justis | D22/142 |
| D. 324,560 | 3/1992 | Terry et al. | D22/142 |
| D. 383,828 | 9/1997 | Grice | D22/142 |
| D. 393,043 | 3/1998 | Grice | D22/142 |
| 2,000,263 | 5/1935 | Teetor | 43/23 |
| 2,116,158 | 5/1938 | Pontis | 43/23 |
| 2,194,639 | 3/1940 | Cole | 43/23 |
| 2,226,897 | 12/1940 | Cole | 43/23 |
| 2,514,950 | 7/1950 | Harrington | 43/23 |
| 2,593,747 | 4/1952 | Godfrey | 43/22 |
| 4,077,150 | 3/1978 | Barnes | 43/23 |
| 4,130,960 | 12/1978 | Fontenot | 43/23 |
| 4,355,480 | 10/1982 | Morishita | 43/23 |
| 4,644,680 | 2/1987 | Dawson | 43/23 |
| 4,654,996 | 4/1987 | Gieselman | 43/23 |
| 4,995,188 | 2/1991 | Ewing | 43/23 |
| 5,291,684 | 3/1994 | Oyama | 43/23 |
| 5,337,507 | 8/1994 | Oyama et al. | 43/23 |
| 5,363,585 | 11/1994 | Ohmura | 32/23 |
| 5,396,727 | 3/1995 | Furuya et al. | 43/23 |

FOREIGN PATENT DOCUMENTS 1-82765 6/1989 Japan .
6-3075 6/1994 Japan .

*Primary Examiner*—Michael J. Carone
*Assistant Examiner*—Darren Ark
*Attorney, Agent, or Firm*—Liniak, Berenato Longacre & White

[57] ABSTRACT

In a fishing rod having a reel seat on a rod pipe, the fishing rod has a finger trigger on the side which is opposite to the side where the reel seat is provided, in such a manner that the finger trigger is so positioned and configured as to allow an angler to cast the fishing line while palming the fishing rod and a reel mounted on the reel seat with one hand.

8 Claims, 11 Drawing Sheets

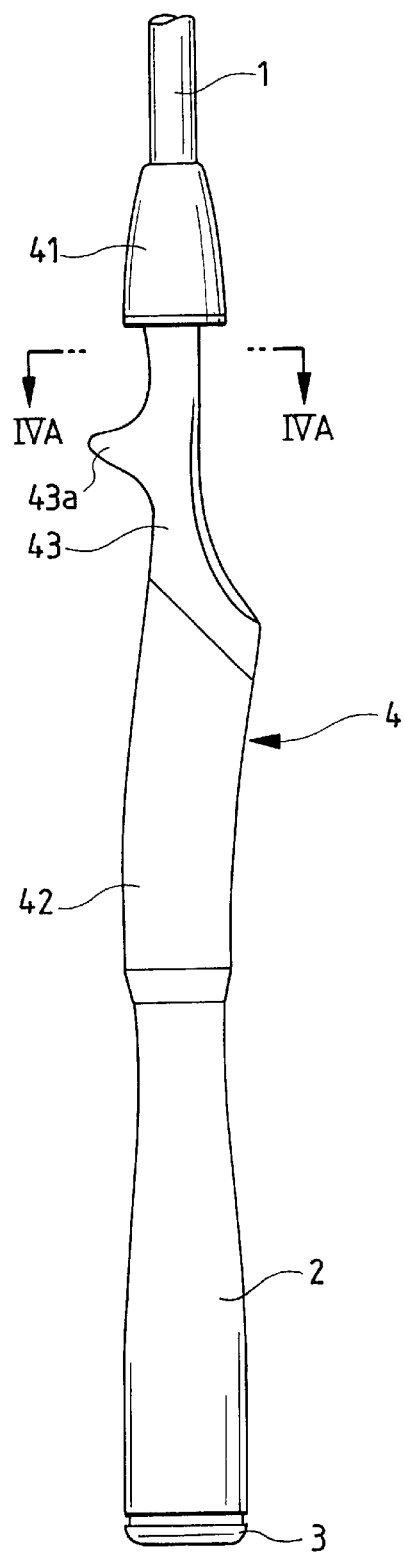
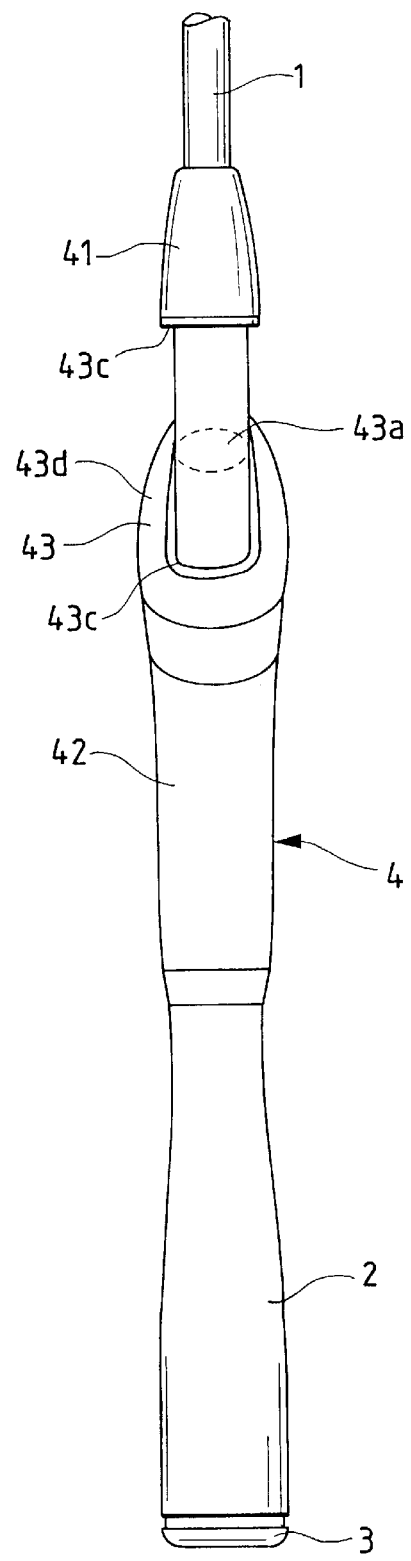

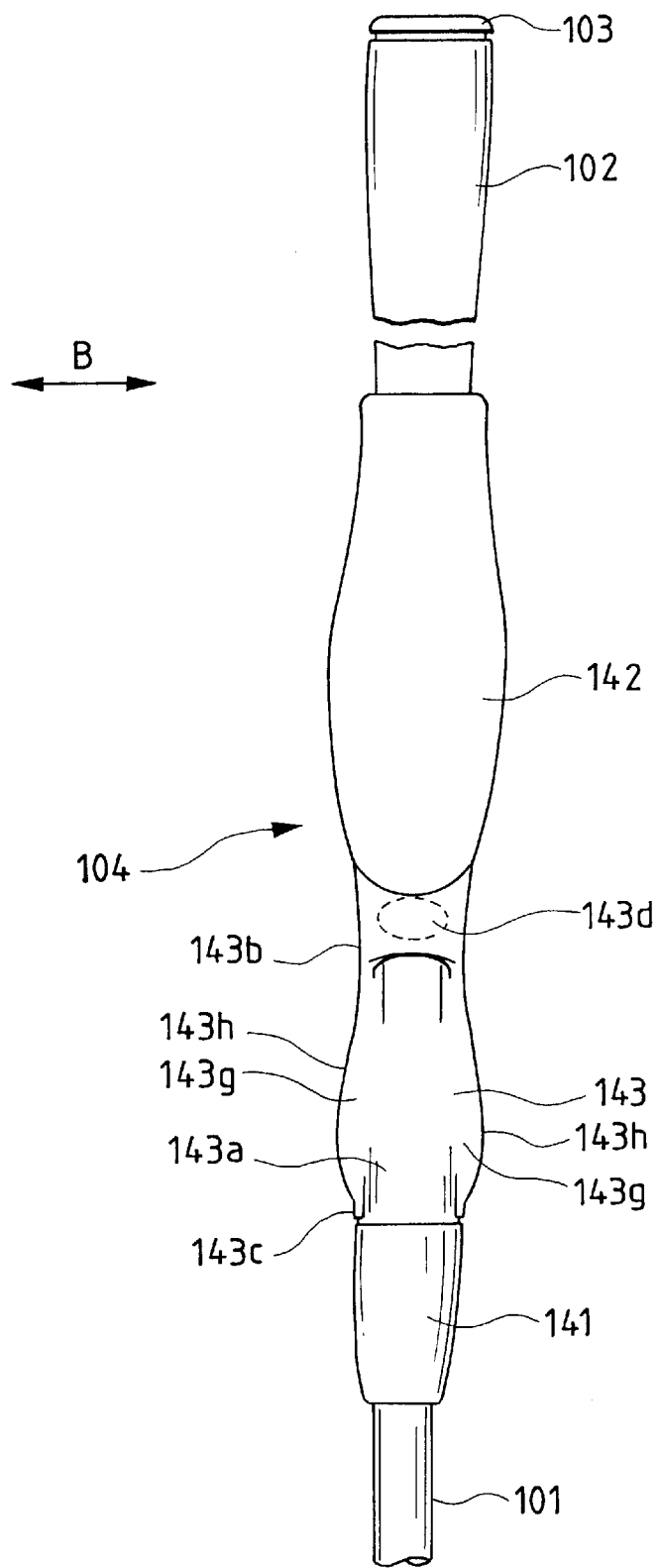

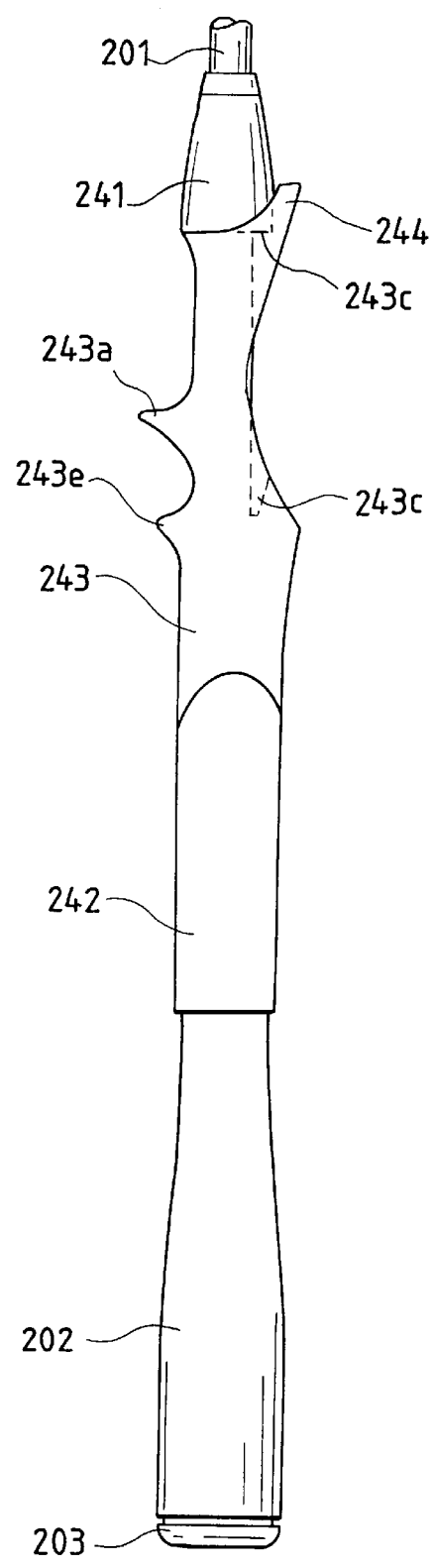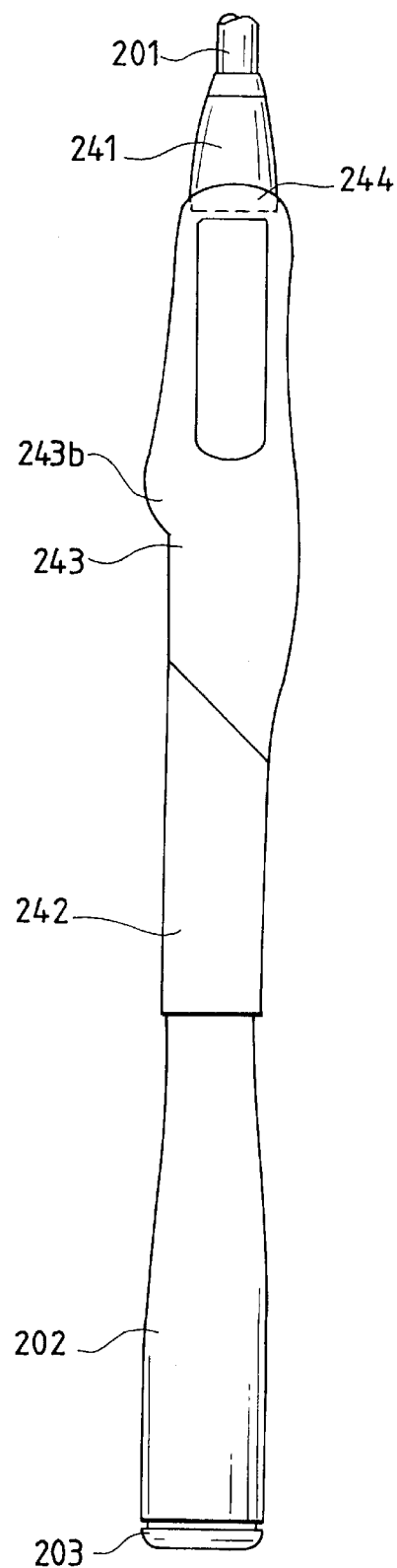

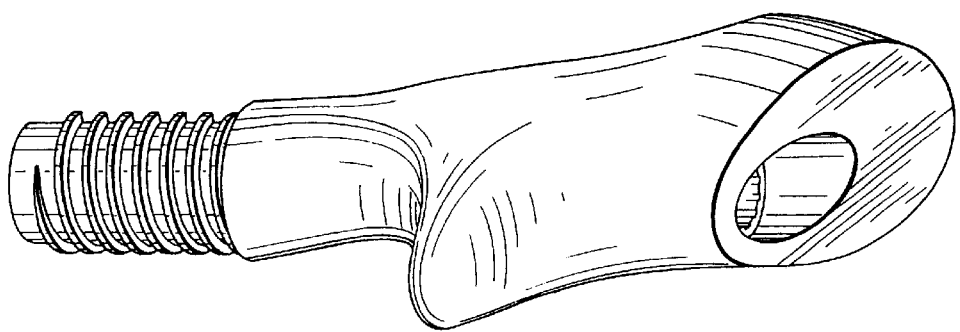
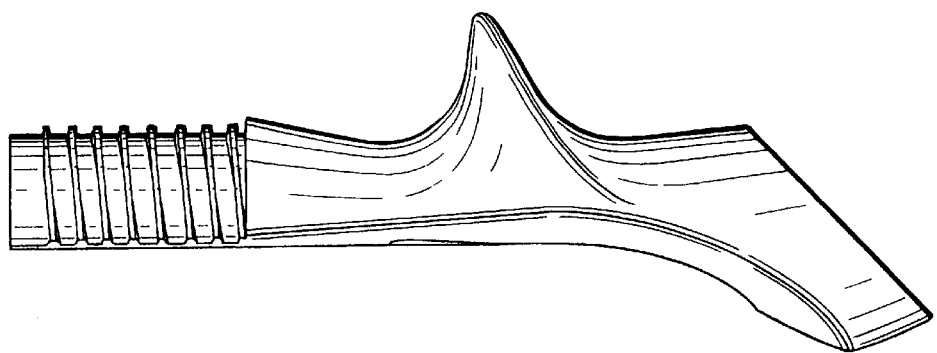
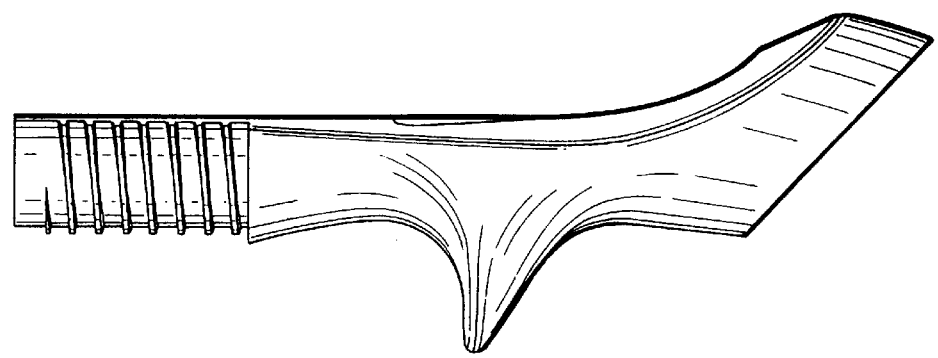
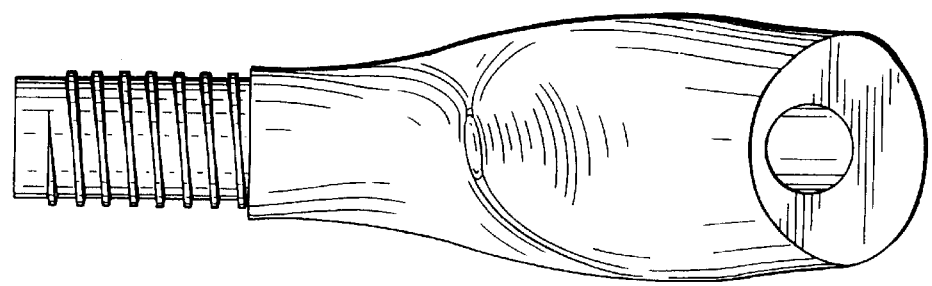

FISHING ROD HAVING IMPROVED GRIPPING PORTION

BACKGROUND OF THE INVENTION a). Field of the Invention

This invention relates to fishing rods, and more particularly to an improvement in operability of a fishing rod.

b). Description of the Prior Art

In general, in bringing the lure of a fishing rod into action, or in hooking a fish, the fishing rod is operated with the latter and the reel held with one hand (while performing a palming operation). Hence, it greatly affects the operability of the fishing rod how well the handle is palmed.

A fishing rod which is designed with the easiness in palming taken into account has been disclosed by Japanese Utility Patent Application (OPI) Nos. 82765/1989 and 3075/1994 (the term "OPI" as used herein means an "unexamined publication application"). The fishing rods thus disclosed have inflated portions beside its reel seat, to improve the palming of the fishing rod.

With the conventional fishing rods, a casting operation is carried out with the index finger put on a trigger which is provided on one side of the fishing rod which is opposite to the other side of the latter where the reel seat is provided, and a palming operation is performed with the trigger held between the third finger and the little finger and with the upper surface of the reel held with the thumb. Hence, when the casting operation is switched over to the palming operation and vice versa, it is necessary to change the way of gripping the fishing rod. That is, it is considerably difficult to perform both the casting operation and the palming operation under the condition that the fishing rod is gripped in a certain manner. If the way of gripping the fishing rod for the casting operation is switched over to the way of gripping the fishing rod for the palming operation, then it is impossible to start the palming operation quickly after the casting operation. Hence, in the case when a bite occurs immediately after the casting operation, it is difficult for the angler to quickly and suitably operate the fishing rod in response to the bite.

In view of the foregoing, the need exists for a fishing rod which can be palmed with high operability, and which allows the angler to cast the fishing line while palming the reel and the fishing rod.

SUMMARY OF THE INVENTION

An object of the invention is to provide a fishing rod which can be palmed with high operability, and which allows an angler to cast the fishing line while palming the reel and the fishing rod.

The present inventors have conducted intensive research on the structure of the foregrip, butt grip, and reel seat of the handle of the fishing rod, and found a variety of structures which allow an angler to cast the fishing line while palming the reel and the fishing rod, thus developing the present invention.

That is, in a fishing rod having a reel seat on a rod pipe, according to one aspect of the invention, the fishing rod has a finger trigger on the side which is opposite to the side where the reel seat is provided, in such a manner that the finger trigger is so positioned as to allow an angler to cast the fishing line while palming the fishing rod and a reel mounted on the reel seat with one hand.

In the above-described fishing rod, it is preferable that a portion of the reel seat which is closer to the front end of the fishing rod is relatively small in width, while the remaining portion of the reel seat which is closer to the base end of the fishing rod is relatively large in width. Furthermore, it is possible that the finger trigger is shifted from the central axis of the rod pipe. In addition, it is also preferable that the fishing rod has, in addition to the aforementioned finger trigger, at least another finger trigger which is smaller than the former and is closer to the base end of the fishing rod.

Furthermore, in a fishing rod having a handle on a rod pipe, according to another aspect of the invention, the handle comprises a foregrip, a butt grip having two side portions, and a reel seat between the foregrip and the butt grip, and the two side portions of the butt grip are so shaped that one of the two side portions is inflated outwardly, while the other is substantially flattened.

Moreover, in a fishing rod having a handle on a rod pipe, according to another aspect of the invention, the handle comprises a foregrip, a butt grip having two side portions, and a reel seat between the foregrip and the butt grip, and the butt grip is gradually smaller in diameter towards the base end of the fishing rod.

In the fishing rod having the handle on the rod pipe, according to another aspect of the invention, the handle comprises a foregrip, a butt grip having two side portions, and a reel seat between the foregrip and the butt grip, and the diameter of the butt grip is in a range of from 17 mm to 27 mm.

In the fishing rod having the handle on the rod pipe, according to the invention, the handle comprises a foregrip, a butt grip having two side portions, and a reel seat between the foregrip and the butt grip, and one end portion of the foregrip, which is closer to the base end of the fishing rod than the other end portion thereof, is at least partially covered with the reel seat.

Preferred embodiments of the invention will be described with reference to the accompanying drawings in detail.

BRIEF DESCRIPTION OF THE DRAWINGS

FIG. 1 is a front view of an example of a fishing rod which constitutes a first embodiment of the invention.

FIG. 2 is a plan view of an example of a fishing rod which constitutes a first embodiment of the invention.

FIGS. 8 and 9 are a front view and a plan view, respectively, showing a fishing rod, which constitutes a sixth embodiment of the invention.

FIGS. 13 and 14 are a front view and a plan view, respectively, showing another example of the fishing rod, which constitutes an eighth embodiment of the invention.

FIGS. 15A—15D show the novel design of the trigger of this invention in various views.

DETAILED DESCRIPTION OF THE PREFERRED EMBODIMENTS

Figure 3A:
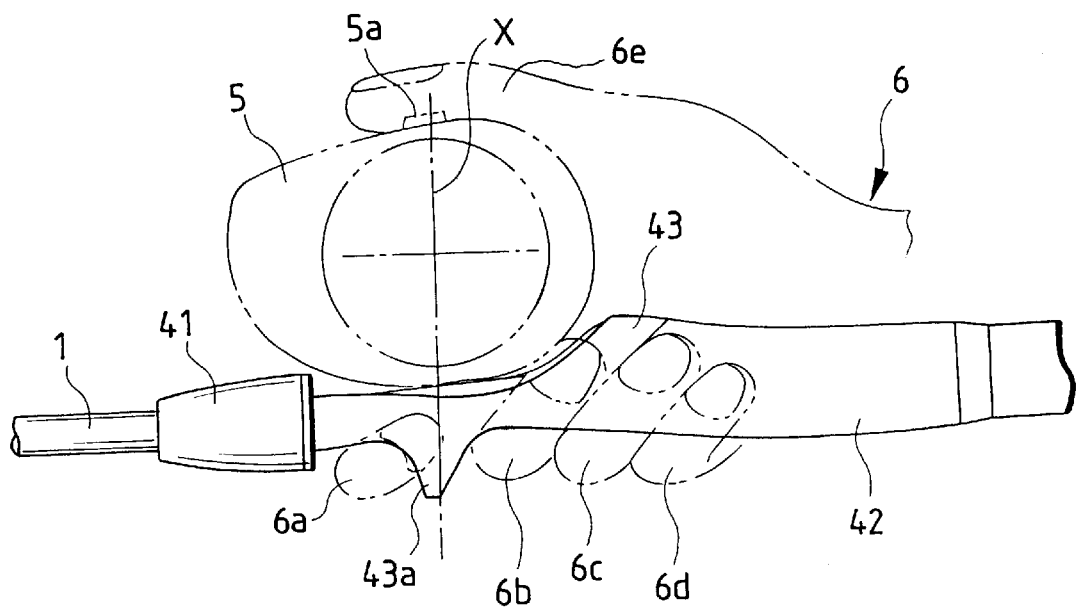
FIGS. 3A and 3B are a front view and a plan view, respectively, illustrating the use of the fishing rod of the first embodiment shown in FIG. 1.
Figure 3B:
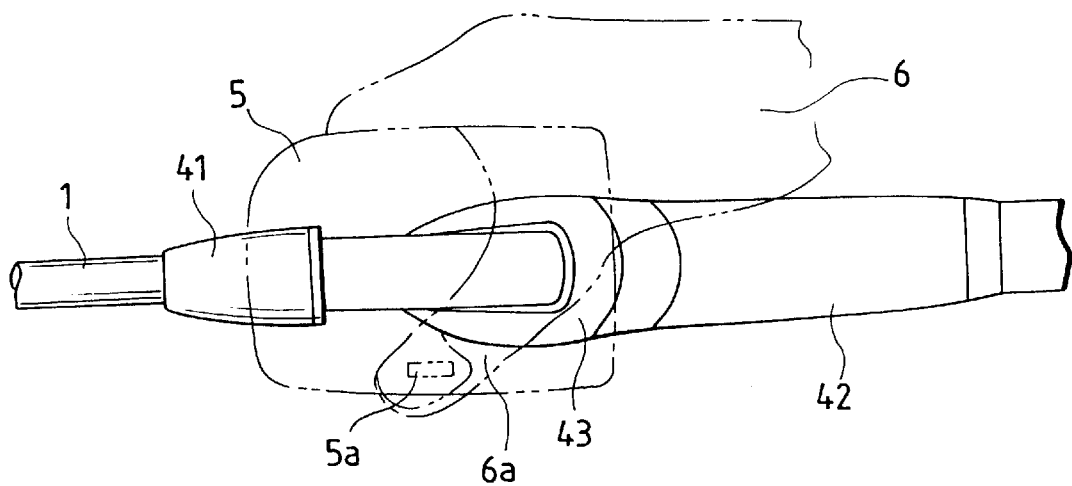

FIGS. 1 and 2 are a front view and a plan view, respectively, of a fishing rod, which constitutes a first embodiment of the invention.

In FIGS. 1 and 2, reference numeral 1 designates a rod pipe of fiber-reinforced prepreg. One end portion (or the rear end portion) of the rod pipe 1 is coupled to an end grip section 2 to which a rod end piece 3 is fastened. The end grip section 2 is gradually smaller in diameter towards the front end portion, and has a handle 4 mounted on its portion which is smaller in diameter than the rear end portion.

The fiber-reinforced prepreg for forming the rod pipe 1 is prepared by impregnating reinforcing fibers with resin which are arranged in a predetermined direction. Examples of the reinforcing fibers are for instance carbon fibers, glass fibers, alumina fibers, and alamide fibers. Examples of the resin for impregnation are for instance epoxy resin, phenol resin, and polyester resin.

The end grip section 2 is so designed in size (or outside diameter) and in configuration that it can be readily gripped (it may be shaped flat as the case may be). The end grip section 2 may be made of fiber-reinforced plastic (FRP) material. The end grip section made of the FRP material is high in mechanical strength, and light in weight, and sensible to a bite. In addition, it may be made of synthetic resin or cork.

The rod end piece may be made of synthetic resin or metal such as aluminum, brass and stainless steel.

The handle 4 essentially comprises a foregrip 41, a butt grip 42, and a reel seat 43 provided between the foregrip 41 and the butt grip 42. The foregrip 41 is rotatably mounted on the reel seat 43; that is, it is turned when the reel is mounted on or removed from the fishing rod. A structure that the reel leg is mounted on the reel seat may be such that the foregrip and/or the butt grip is made rotatable (in FIG. 1, only the foregrip is rotatable), and the reel leg is fitted in the reel leg receiving portions (or hoods) 43c, or the reel leg is threadably secured to the foregrip and/or the butt grip.

The foregrip 41 and the butt grip 42 may be made of artificial cork, natural cork, foamed material or wood. The foregrip 41 includes a threaded portion, and a reel seat receiving portion. In order to reinforce those portions, the latter may be made by using metal or ceramic material.

The foregrip includes a member that is not designed to be positively gripped by an angler's hand, as long as the member is designed to form a front hood in cooperation with the reel seat. Therefore, a nut member which forms a front hood is cooperation with the reel seat but cannot be positively gripped by the angler's hand is included in the foregrip set forth in the instant disclosure. Further, the foregrip may be integral with the reel seat as long as a rear hood is movable relative to the front hood.

On the side of the reel seat 43 which is opposite to the side where the reel is mounted (i.e., the rear side, hereinafter being referred to as "a finger contact side", when applicable), a trigger 43a is so positioned as to allow the angler to suitably cast the fishing line while holding the fishing rod and the reel on the reel seat with his one hand. The trigger is so shaped that the fingers are prevented from shifting and the angler is able to positively grip the fishing rod. The position where the trigger should be provided to allow the angler to perform a casting operation while holding the fishing rod and the reel with his one hand is, for instance, between the reel leg receiving portions 43c, or near inflated side portions 43d. More specifically, the position is as shown in FIG. 3A. That is, it is on the prolongation of a phantom line X which is extended from the clutch 5a of the reel 5 mounted on the reel seat 43 towards the axis of the rod pipe 1; or it is on or near the axis of the spool of the reel.

Therefore, a first trigger member is located substantially opposite to a mid point of the reel seat along the longitudinal direction or substantially aligned with a clutch actuator provided on the fishing reel so that the trigger member is interposed ergonomically between the index finger and the middle finger or between the middle finger and the third finger of the angler who casts the fishing line while palming the fishing rod and the fishing reel mounted on the reel seat with one hand.

The reel seat 43 may be made of fiber-reinforced plastic (FRP) material or synthetic resin material. It is preferable to provide an elastic member of rubber or the like on the part of the reel seat which the angler's hand touches. The trigger 43 may be integrally formed as a part of the reel seat 43 when the latter is formed, or it may be provided as an individual component. In the latter case, the trigger 43 is bonded to the reel seat 43, for instance, with adhesive. On the other hand, it is preferable that the surface of the reel seat on the finger contact side which is closer to the base end of the fishing rod than the trigger is so shaped as to prevent the angler's fingers from shifting and to allow him to positively grip the fishing rod. For this purpose, in addition to the trigger 43, another trigger smaller than the former 43 may be formed, or the surface of the reel seat on the finger contact side may be bent.

When used, the above-described fishing rod is held with the hand 6 as shown in FIG. 3A. That is, with the index finger 6a laid on the trigger 43a at an index finger receiving portion 43g, the portion of the reel seat 43 which is closer to the base end of the fishing rod than the trigger 43 and the recessed portion 93e of the butt grip on the finger contact side are gripped with the middle finger 6b, the third finger 6c, and the small finger 6d, and the side wall and the upper wall raised portion 43f of the reel 5 are held with the palm and the thumb 6e.

In the case where the fishing rod of the invention is held with the hand in the above-described manner, the trigger 43a is on the finger contact side of the reel seat and is located at the position where the trigger should be located to allow the angler to perform a casting operation while holding the fishing rod and the reel with his one hand; that is, the position is substantially below the clutch 5a of the reel 5 in FIG. 3A. Hence, the fishing rod can be positively gripped with the four fingers (the index finger 6a, the middle finger 6b, the third finger 6c and the small finger 6e) and the palm. Accordingly, the reel 5 and the fishing rod can be positively palmed at the same time (a palming operation). In this case, as was described above, the reel 5 and the fishing rod are positively gripped, which allows the angler to start the casting operation immediately. Furthermore, with the fishing rod gripped in the above-described manner, the clutch 5a can be readily operated with the thumb 6e to turn on and off the spool.

As is apparent from the above description, with the fishing rod of the invention, the angler can cast the fishing line while palming the reel and the fishing rod with one hand, and after the casting operation, he can operate the fishing rod and the reel without delay. In this operation, since the hand gripping the fishing rod is prevented from slipping, the palming operation and the casting operation can be positively performed, and the angler's hand will never get tired nor have pain.

In a modification of the foregoing embodiment, it is preferable that, in the fishing rod of the invention, the portion of the reel seat 43 which is closer to the front end of the fishing rod than the trigger 43a is small in width, and accordingly the portion of the reel seat 43 which is closer to the base end of the fishing rod than the trigger 43a is relatively large in width; for instance, the portion of the reel seat which is closer to the base end of the fishing rod than the trigger is large in width (or flat) in a direction which is substantially in parallel with the reel leg setting surface.

The fishing rod modified in the above-described manner is advantageous in the following points: In the casting operation, the finger (i.e., the index finger 6a) can be wound on the portion of the reel seat which is small in width, which makes it possible for the angler to perform the casting operation with ease while palming the reel and the fishing rod. In addition, the portion of the reel seat which is large in width can be readily securely held with the middle finger 6b, the third finger 6c, and the small finger 6d; that is, the fishing rod can be positively gripped with the hand. This feature allows the angle to perform both a palming operation and a casting operation with ease. In addition, in the casting operation, the fishing line can be readily controlled in direction.

Figure 4A:
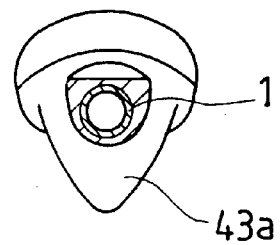
FIG. 4A is a sectional view of the first embodiment taken along line IVA—IVA in FIG. 1.
Figure 4B:
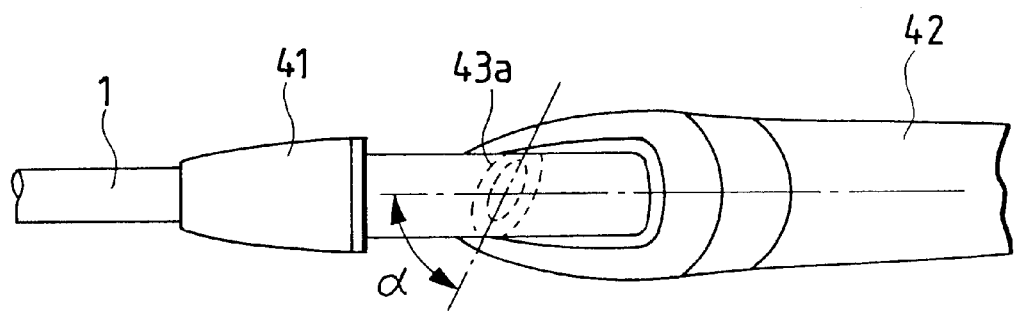
FIG. 4B is a plan view showing another example of the fishing rod, which constitutes a third embodiment of the invention.
Figure 4C:
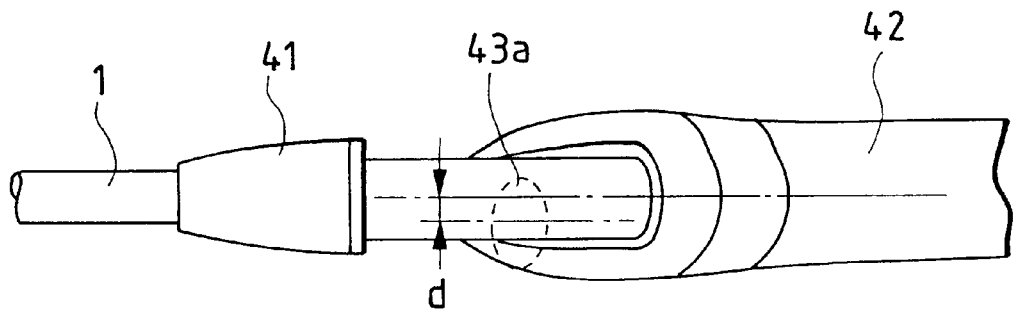
FIG. 4C is a plan view showing a modification of the third embodiment of the fishing rod.

FIGS. 4A–4C show a third embodiment of this invention. As shown in FIG. 4A, the trigger 43a of the reel seat 43 is extended below from the handle 4 so that the angler's finger is laid on it. In this third embodiment, the median of the trigger 43a is shifted or offset from the axis of the rod pipe 1. The shifting of the trigger 43 in the above-described manner means that, as shown in FIG. 4B, the trigger 43 is so formed such that the major diameter of the elliptic section of the trigger 43 forms an angle a with the central axis of the rod pipe 1 which is other than 90° (i.e., it is inclined to right or to left), or, as shown in FIG. 4C, a distance d is provided between the minor diameter of the elliptical section of the trigger 43a and the central axis of the rod pipe 1. Concretely stated, it is preferable that, with both the finger laying angle, and a state of the hand gripping the fishing rod in the palming operation taken into account, the angle α be set in the following range, $45° \leq \alpha \leq 85°$, and the distance d is about half of the width of the inflated portion when measured from the central axis of the rod pipe.

FIGS. 15A–15D show the novel design of the trigger of this invention in various views.

In the above-described embodiment, the configuration of the section of the trigger 43 which is taken into account is elliptic; however, the invention is not limited thereto or thereby. That is, it may be S-shaped, or D-shaped (in this case, the front side of the trigger is arcuate, and the rear side is flat). In this case, the trigger 43a may be shifted towards the front end or the base end of the fishing rod when compared with the trigger 43a in the first embodiment.

As was described above, in the third embodiment, the trigger 43a is shifted from the central axis of the rod pipe 1. Hence, when the angler operates the fishing rod in various manners during the palming operation, he can hold the fishing rod in such a manner that the fishing rod is fitted to the configuration of the hand. For instance, when the angler wants to lay his finger on the trigger, or when he wants to balance the fishing rod and the reel with each other by moving the center of gravity of the fishing rod to the right or left of the central axis of the fishing rod, or he wants to adjust the angle between the hand and the fishing rod, he can hold the fishing rod with the latter fitted to the configuration of the hand. The direction in which the trigger is shifted is determined separately according to whether the fishing rod is provided for right-handed persons only or whether it is provided for left-handed persons only, and kinds of reels.

In a fourth embodiment of the fishing rod of the invention, at least one trigger (43e in FIG. 8) smaller than the above-described trigger 43a (hereinafter referred to as "a small trigger 43e", when applicable) is provided in such a manner that it is closer to the base end of the fishing rod than the trigger 43a (hereinafter referred to as "a large trigger 43a", when applicable). The trigger 43e should be smaller than the trigger 43a with the palming operation taken into account.

With a plurality of triggers thus provided, the angler is able to readily perform the casting operation while palming the reel and the fishing rod. The trigger 43e, being smaller than the trigger 43a, will not obstruct the operation of the fishing rod.

Figure 5:
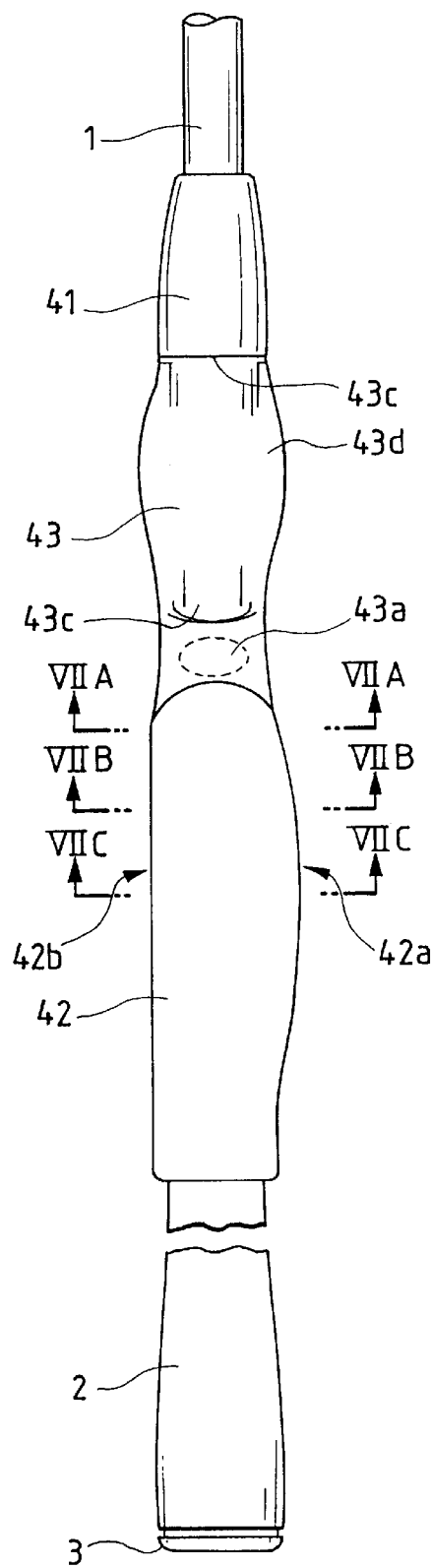
FIGS. 5 and 6 are a plan view and a front view, respectively, for a description of another example of the fishing rod, which constitutes a fifth embodiment of the invention.
Figure 6:
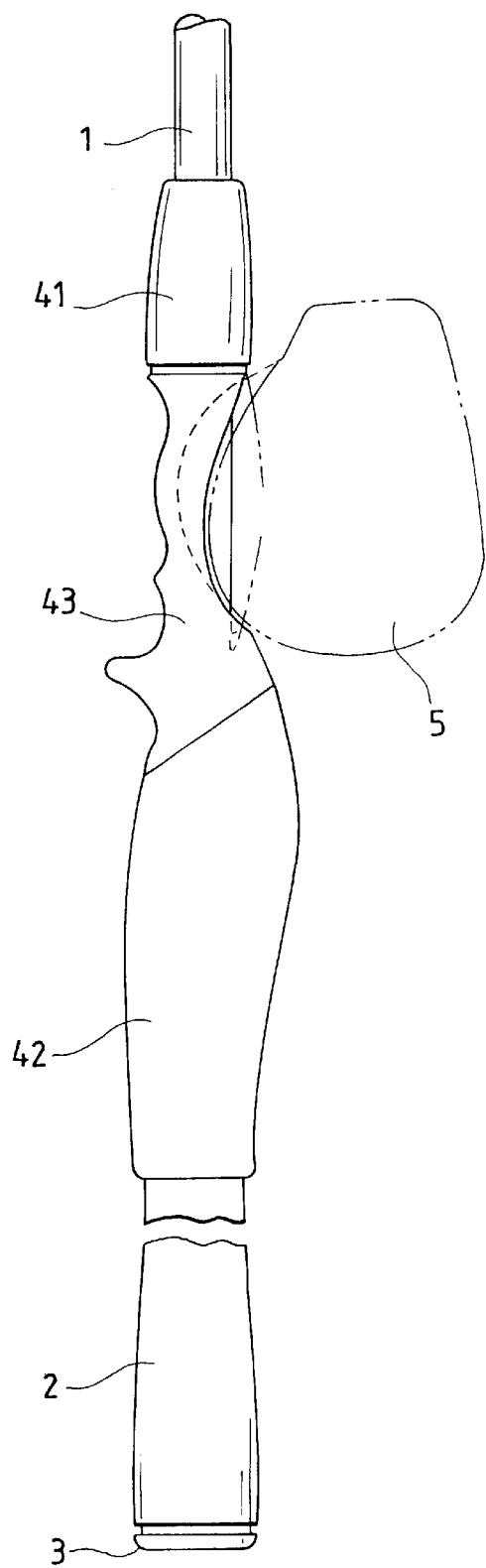
Figure 7A:
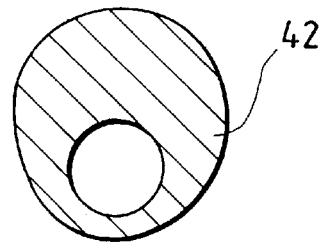
FIGS. 7A, 7B and 7C are sectional views taken along lines VIIA—VIIA, VIIB—VIIB, and VIIC—VIIC in FIG. 5, respectively.
Figure 7B:
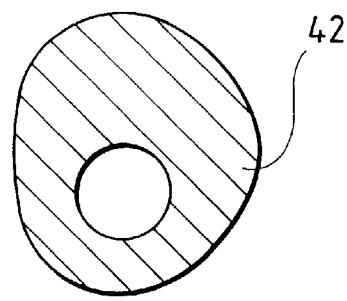
Figure 7C:
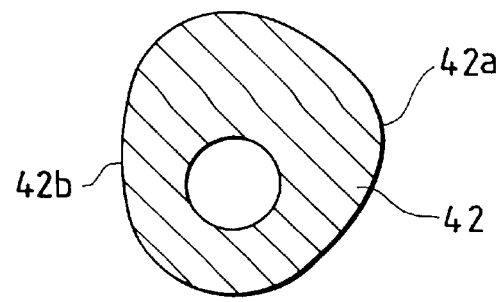

FIGS. 5 and 6 are a plan view and a front view, respectively, for a description of a fifth embodiment of the invention. FIG. 7A is a sectional view taken along line VIIA—VIIA in FIG. 5, FIG. 7B is a sectional view taken along line VIIB—VIIB in FIG. 5, and FIG. 7C is a sectional view taken along line VIIC—VIIC in FIG. 5. In FIGS. 5 and 6, parts corresponding functionally to those already described with reference to FIG. 1 are therefore designated by the same reference numerals or characters.

As shown in FIG. 5, the butt grip 42 is inflated on its one side (on the right side 42a in FIG. 5), and substantially flattened on its other side (on the left side 42b in FIG. 5). The butt grip 42, as shown in FIGS. 7A–7C, are not bisymmetrical; that is, as is seen from FIG. 5, the right and left contour lines are different from each other. Furthermore, as is seen from FIG. 7C, the inflated portion 42a of the butt grip 42 on one side is located above the central axis of the rod pipe 1 with the position taken into account which the dent of the palm takes in a casting operation. On the other hand, the flattened portion 42b of the butt grip 42 on the other side is so designed that it has a predetermined length in the direction of thickness (in a vertical direction in FIG. 7). The term "a predetermined length" as used herein is intended to mean that a length long enough for the flattened portion to abut against the palm in the palming operation. The sides on which the inflated portion 42a and the flattened portion 42b are provided, are suitably determined depending on the dominant hand of an angler, the configuration and structure of a reel to be mounted. Generally, the flattened portion 42b is provided on the same side as the angler's hand which performs a palming or casting operation. For instance in the case where a palming or casting operation is performed with the left hand, the flattened portion 42b is provided on the left side in FIG. 5.

The fishing rod thus designed allows the angler to readily cast the fishing line. With the fishing rod, the angler is able to cast the fishing line while palming the reel and the fishing rod. This means that the fishing rod is considerably high in operability.

Figure 8:
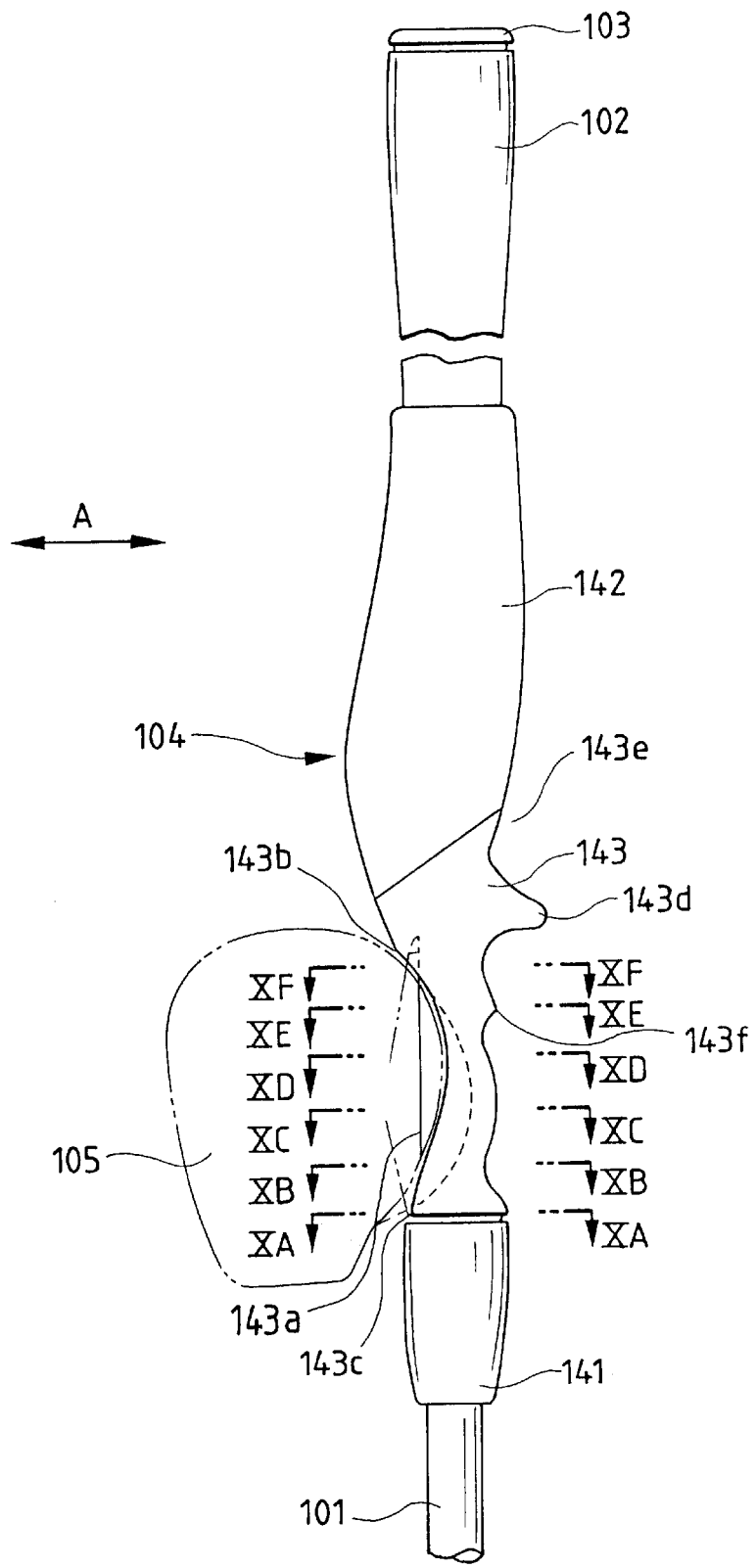
Figure 10A:
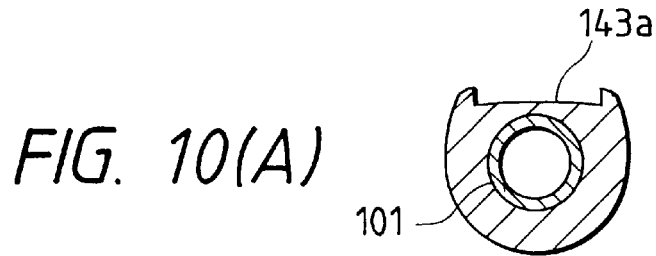
FIG. 10A is a sectional view taken along line XA—XA in FIG. 8.
Figure 10B:
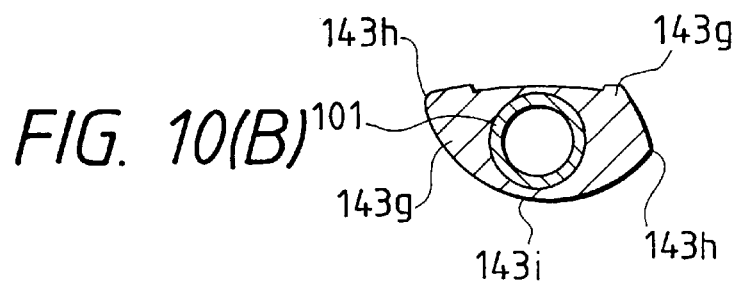
FIG. 10B is a sectional view taken along line XB—XB in FIG. 8.
Figure 10C:
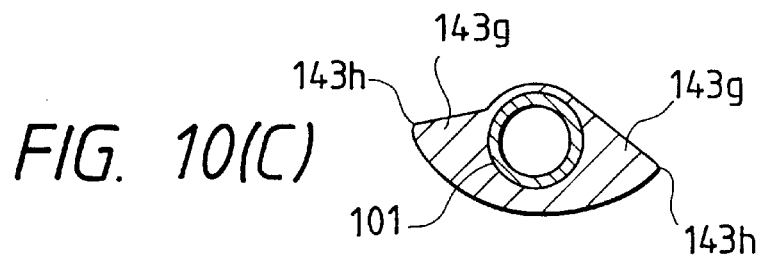
FIG. 10C is a sectional view taken along line XC—XC in FIG. 8.
Figure 10D:
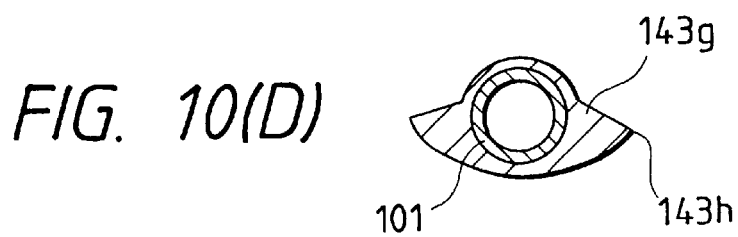
FIG. 10D is a sectional view taken along line XD—XD in FIG. 8.
Figure 10E:
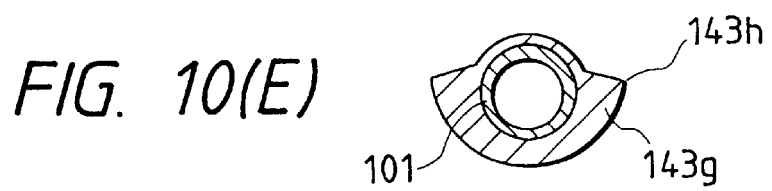
FIG. 10E is a sectional view taken along line XE—XE in FIG. 8.
Figure 10F:
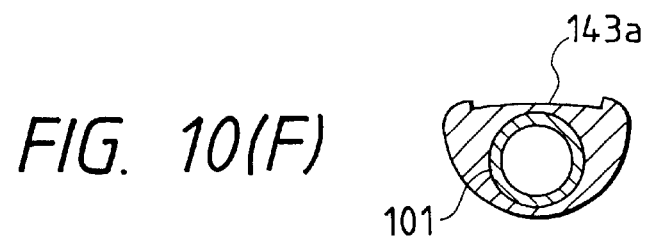
FIG. 10F is a sectional view taken along line XF—XF in FIG. 8.

FIGS. 8 and 9 are a front view and a plan view, respectively showing a fishing rod, which constitutes the sixth embodiment of the invention.

The butt grip 142, as shown in FIGS. 8 and 9, has contour lines which are gradually curved outwardly as viewed not only in the direction of thickness but also in the direction of width (for convenient in description, the direction A indicated in FIG. 8 is referred to as "thickness", and the direction B indicated in FIG. 9 as "width").

On the reel mounting side of the reel seat 143, a reel leg setting surface 143a is provided; and a stationary hood receiving section 143b adapted to receive the stationary hood of a reel 105, and a movable hood receiving section 143c adapted to receive the movable hood of the reel are provided.

On the finger contact side, a trigger 143d is provided which is so shaped that the fingers are prevented from shifting and the angler is able to positively grip the fishing rod. The trigger 143d merges through a groove 143e with the gradually curved portion of the butt grip 142. On the finger contact surface of the reel seat, a small trigger 143f is formed closer to the foregrip than the trigger 143d (hereinafter referred to as "a large trigger 143d", when applicable). The remaining part of the finger contact surface which is on the side of the foregrip being located ahead of the small trigger 143f is so shaped that the fingers are prevented from shifting and the angler is able to positively grip the fishing rod. As the case may be, the large and small triggers 143d and 143f may be changed in number and in height, and the finger contact surface may be modified in configuration, depending on the characteristics required for the finger contact surface. The reel seat 143 may be made of fiber-reinforced plastic (FRP) material or synthetic resin material. It is preferable to provide an elastic member of rubber or the like on the part of the reel seat the angler's hand touches.

In the formation of the reel seat, the large and small triggers 143d and 143f may be formed as follows: That is, those triggers 143d and 143f are formed integral with the reel seat. Alternatively, the small and large and small triggers 143d and 143f are formed separately from the reel seat 143, and then they are bonded to the reel seat 143 with adhesive.

As shown in FIG. 9, the reel seat 143 includes right and left inflated portion 143g which are inflated on both sides of the rod pipe 111. The inflated portions 143g, as shown in FIGS. 10A–10F, are not bisymmetrical. As is seen from FIGS. 10B & 10C, the ridges of the right and left inflated portions 143g are different in height, being non-bisymmetrical. The term "non-bisymmetrical" as used herein is intended to mean that the right and left inflated portions are different in configuration from each other. The right and left inflated portions may be so shaped that they are different in thickness from each other as shown in FIGS. 10A–10F, or in width as shown in FIG. 9. The surfaces 143i which are located below the inflated portions 143g may be bent to form protrusions so that the fingers can be readily put on the handle or positively positioned thereon. In this case the protrusions thus formed may be made different in size, thus being non-bisymmetrical. In this connection, the protrusions should be made non-bisymmetrical with the configuration and structure of the reel to be mounted taken into account.

It is preferable that, when the angler (or user) grips the fishing rod in such a manner that the reel is located above the rod pipe, one of the inflated portions which is on the same side as a hand of the angler grips the fishing rod is more inflated than the other inflated portion. More specifically, it is preferable that, in the case where the angler grips the fishing rod with his left (or right) hand, the left (or right) inflated portion is more inflated than the right (or left) inflated portion under the condition that, with the rear end portion of the fishing rod set just before him, the reel is located above the rod pipe. This feature makes it possible to positively perform the palming operation with the hand gripping the fishing rod, which improves the operability of the fishing rod.

Figure 11:
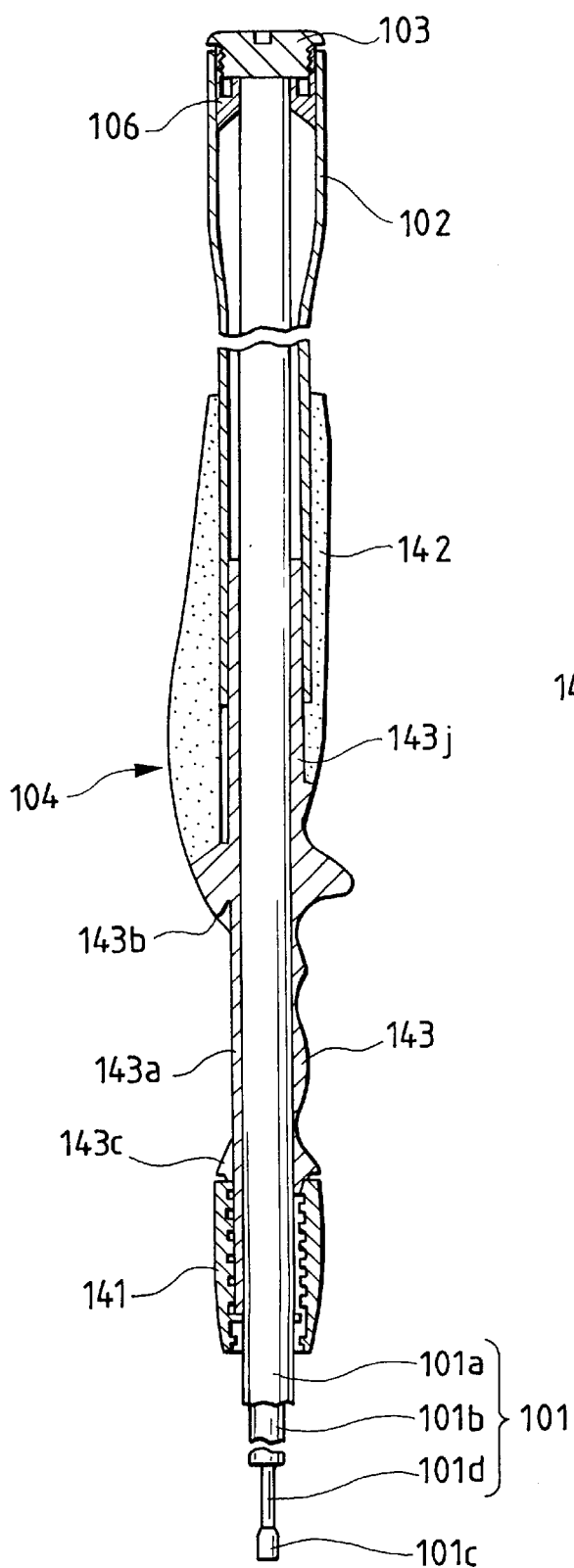
FIG. 11 is a sectional view of the fishing rod according to the sixth embodiment to the invention.

The coupling structure of the fishing rod according to the invention will be described with reference to FIG. 11. FIG. 11 is a sectional view of the fishing rod shown in FIG. 8. The rod pipe 101 is made up of a base rod pipe 101a, at least one intermediate rod pipe 101b which can be pushed into and pulled out of the base rod pipe 101a, and a tip rod 101d which can be pushed into and pulled out of the intermediate rod pipe 101b and has a tip ring 101 for guiding the fishing line.

The end grip section 102 is fixedly mounted on one end portion (or rear end portion) of the base rod pipe 101a through a spacer 106 of FRP or the like. The inner cylindrical surface of the rear end portion of the spacer 106, and the outer cylindrical surface of the rod end piece 103 are threaded, so that the rod end piece 103 is fixedly secured to the end grip section 102 by threadably engaging the spacer 106 and the rod end piece 103 with each other. Hence, by removing the rod end piece 103, the intermediate rod pipe 101b and the tip rod 101d may be taken out of the base rod pipe 101a.

The end grip section 102 is in the form of a pipe-shaped member which is extended towards the front end of the fishing rod. The reel seat 143 has its extension 143j which is fitted in the end grip section 102. In the region of the end grip section 101 which is between the spacer 106 and the junction of the pipe-shaped member and the extension of the reel seat 143, the pipe-shaped member and the base rod pipe 101a are spaced from each other.

The butt grip 142 of the handle 104 is mounted on the end grip section 102 in the region which includes the junction of the pipe-shaped member and the extension 143j of the reel seat 143. Depending on the material of the butt grip 142, the butt grip 142 may be modified as follows: That is, the butt grip 142 is made up of at least two parts. The two parts are bonded to the end grip section to fixedly form the butt grip 142 thereon. Alternatively, the butt grip 142 is formed integral with the end grip section 102, for instance, by injection molding.

The reel seat 143 is made of synthetic resin or the like, and is mounted on the base rod pipe 101a; however, the fishing rod may be so modified that the rod pipe is exposed so that the reel leg is in direct contact with the rod pipe. The outer cylindrical surface of the front end portion of the reel seat 143, and the inner cylindrical surface of the foregrip 141 are threaded, so that the reel seat 143 and the foregrip 141 are threadably engaged with each other. Hence, the reel may be fixedly secured to the fishing rod as follows: First, the foregrip 141 is turned so that it is moved towards the front end of the fishing rod, and then the reel leg is set on the reel leg setting surface 143a. And the stationary hood is inserted in the stationary hood receiving section 143b while the movable hood is inserted in the movable hood receiving section 143c. Under this condition, the foregrip 141 is turned so that it is moved towards the rear end of the fishing rod, whereby the reel is fixedly secured to the fishing rod.

Figure 12:
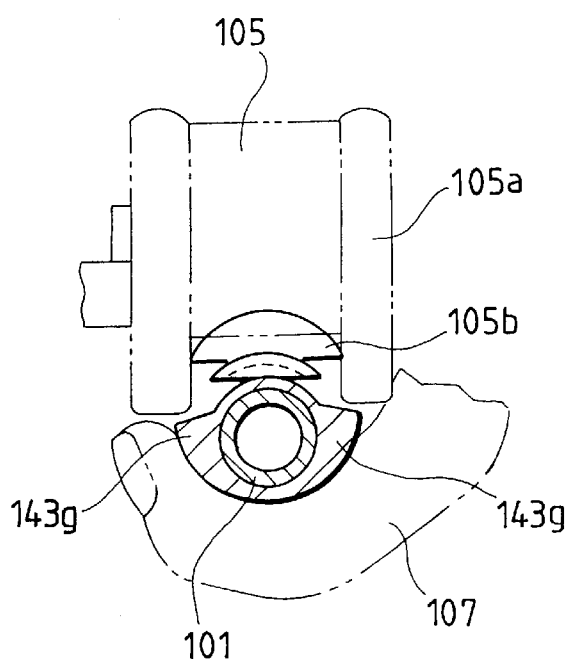
FIG. 12 is a diagram for a description of the gripping of the fishing rod according to the sixth embodiment of the invention.

Now, the gripping of the fishing rod according to the invention will be described with reference to FIG. 12. FIG. 12 is a diagram for a description of the gripping of the fishing rod according to the invention, corresponding to a sectional view of FIG. 10C.

As is seen from FIG. 12, the upper surfaces of the inflated portions 143g are shifted downwardly from the reel leg setting surface. That is, with the reel 105 positioned above the rod pipe 101, the upper surfaces of the inflated portions 106, as shown in FIG. 12, are inclined downwardly as the reel seat increases in outside diameter. This is to prevent the inflated portions 143g from colliding with the side frames 105a of the reel 105 (hereinafter referred to as "reel side frames 105a", when applicable) which is mounted on the fishing rod. With this structure, the reel side frames 105a are lowered; that is, the lower surfaces of the reel side frames 105a come below the reel leg 105b (or the former is closer to the fishing rod than the latter). This feature decreases the distance between the lowermost part of the fishing rod and the uppermost part of the reel 105 as much. As a result, the gripping (palming) of the fishing rod and the reel with the finger 107 supporting the lowermost part of the fishing rod and the finger (not shown) is achieved considerably readily and positively.

Furthermore, the above-described structure of the fishing rod eliminates the difficulty that, in the case where a reel is mounted on the fishing rod which is such that the lower surfaces of the reel side frames comes below the lower surface of the reel leg, a gap is formed between the reel and the fishing rod, or it is impossible to mount the reel on the fishing rod.

As was described above, the inflated portions formed on both sides of the fishing rods are not bisymmetrical. Hence, the fishing rod of the invention may be made into a fishing rod to be used with a right hand only or a left hand only, or a fishing rod for a right-handle reel only or a left-handle reel only. This feature improves the gripping of the fishing rod, and enhances the operability of the fishing rod which is mainly operated with a single hand. The above-described structure that the inflated portions are made non-bisymmetrical, and the upper surfaces of the latter are set below the reel leg setting surface, markedly improves the gripping of the fishing rod. That is, the fishing rod of the invention is high in operability.

To make the right and left inflated portions non-bisymmetrical may be achieved by making the right and left inflated portion different in the amount of shift. In this case, the amounts of shift of the right and left inflated portions are suitably determined with the configuration of the reel seat and the relationship between the reel leg and the reel seat taken into account.

In a seventh embodiment of the fishing rod of the invention, the butt grip 42 is smaller in diameter towards the base end of the fishing rod. In this case, the degree to which the diameter of the butt grip 42 is decreased is not particularly limited; that is, depending on the configuration of the butt grip, the butt grip may be gradually or suddenly sloped towards the base end of the fishing rod. Furthermore, depending on the configuration of the butt grip, it is not always necessary that the butt grip is gradually smaller in diameter towards the base end of the fishing rod. That is, the butt grip should be smaller in diameter towards the base end of the fishing rod as a whole. Hence, the butt grip may include a portion in the middle which is not changed in diameter (not sloped).

The fishing rod thus designed allows the angler to cast the fishing line with ease. In addition, with the fishing rod, the angler is able to perform the casting operation while palming the reel and the fishing rod. This means that the fishing rod is high in operability.

In a eighth embodiment of the fishing rod of the invention, the diameter of the butt grip is in a range of from 17 mm to 27 mm. This diameter is the maximum diameter of the butt grip, and the average of the diameter in the direction of thickness (in a direction perpendicular to the reel leg setting surface) of the butt grip 42, and the diameter in the direction of width (in a direction in parallel with the reel leg setting surface) of the butt grip 42. In addition, it is preferable that the maximum diameters of the butt grip 42 measured both in the direction of width and in the direction of thickness are in a range of from 17 mm to 27 mm. Further-more, it is preferable that the butt grip includes a portion 15 to 22 mm in diameter at a distance of 4 to 10 cm from the rear hood of the reel seat engaged with the reel leg.

In the conventional fishing rod, the average value of the diameter of the butt grip 42 in the direction of thickness and the diameter of the same in the direction of width is at least 30 mm. Hence, with the conventional fishing rod, it is rather difficult for the angler to cast the fishing line while palming the reel and the fishing rod. On the other hand, with the fishing rod of the invention, the angler is able to readily grip the fishing rod on the side of the small finger, which allows the angle to perform a casting operation while palming the reel and the fishing rod. That is, the fishing rod of the invention is high in operability.

FIGS. 13 and 14 are a front view and a plan view, respectively, showing a ninth embodiment of the invention.

Both the outer cylindrical surface of the front end portion of the reel seat 243 which is on the side of the front end of the fishing rod, and the inner cylindrical surface of the foregrip 241 are threaded so that the reel seat 243 and the foregrip 241 are threadably engaged with each other. Hence, the reel is fixedly mounted on the fishing rod as follows: The foregrip 241 is turned, thus being moved towards the front end of the fishing rod. Under this condition, the reel leg is abutted against the reel seat 243, and the stationary hood is inserted in the stationary hood receiving portion while the movable hood is inserted in the movable hood receiving portion. Under this condition, the foregrip 241 is turned in the opposite direction, thus being moved towards the base end of the fishing rod. Thus, the reel has been fixedly mounted on the fishing rod.

In the ninth embodiment, the real seat 243 has a protecting protrusion 244 which covers the base end portion (on the side of the base end of the fishing rod) of the foregrip 241. The protecting protrusion 244 may be so shaped as to cover the base end portion of the foregrip 241 in its entirety, or a part of the base end portion of the foregrip 241 as shown in FIG. 13. However, it is preferable that the protecting protrusion is so designed as to cover a part of the base end portion of the fore grip 241 because the fore grip 241 must be turned when the reel is to be mounted the fishing rod. In the case of FIG. 13, the protecting protrusion is formed integral with the reel seat 243; however, the invention is not limited thereto or thereby. That is, the protecting protrusion 243 may be designed as follows: The protecting protrusion is provided as an individual component, and it is bonded to or welded to the reel seat.

As was described above, in the ninth embodiment, the reel base has the protecting protrusion 244. Hence, when the angler casts the fishing line while palming the reel and the fishing rod, the foregrip will never be turned even if the finger, especially the index finger, abuts against the foregrip 241; that is, the ninth embodiment is free from the difficulty that, in a casting operation, the foregrip is accidentally turned to loosen the reel leg from the reel seat. In other words, the fishing rod can be stably operated for a long time without unwanted loosening of the reel mounting structure. With the fishing rod of the invention, even when the angler strongly casts the fishing line, the foregrip 241 is prevented from being turned and loosened.

In the ninth embodiment, as shown in FIG. 14, the reel seat 243 may include an inflated portion 243b. The side of the reel seat on which the inflated portion 243b is formed, is suitably determined depending on the dominant hand of an angler, the configuration and structure of a reel to be mounted. Generally, the inflated portion 243b is provided on the same side as the angler's hand which performs a palming or casting operation. For instance in the case where a palming or casting operation is performed with the left hand, the inflated portion 243b is provided on the left side in FIG. 14.

The fishing rod thus designed allows the angler to readily cast the fishing line. With the fishing rod, the angler is able to cast the fishing line while palming the reel and the fishing rod. In addition, the foregrip 241 is prevented from being turned and loosened. This means that the fishing rod is considerably high in operability.

The specific features of the above-described first through ninth embodiments may be employed in combination.

While there has been described in connection with the preferred embodiments of the invention, it will be obvious to those skilled in the art that various changes and modifications may be made therein without departing from the invention. For instance, the above-described fishing rods may be modified as follows: The foregrip is made of a soft material, while the butt grip is made of a hard material. And, the foregrip is made of a rough (not slippery) material while the butt grip is made of a slippery material. Alternatively those grips are subjected to surface treatment so that the foregrip is not slippery, and the butt grip is slippery.

With the fishing rod thus designed, the angler is able to readily perform the palming operation, and even when the butt grip abuts against his arm, it will not caught by the latter, thus not adversely affecting the operability of the fishing rod.

In fixing the butt grip, a hollow pipe such as an FRP rod pipe may be employed.

As was described above, the fishing rod of the invention comprises the rod pipe, and the handle including the reel seat on the rod pipe, and it is so designed that the angler is able to cast the fishing line while palming the reel and the fishing rod. Hence, with the fishing rod of the invention, it is unnecessary to switch the way of gripping the fishing rod for the casting operation over to the way of gripping the fishing rod for the palming operation. Hence, in the case when a bite occurs immediately after the casing of the fishing line, it is possible for the angler to quickly and suitably operate the fishing rod in response to it.

Furthermore, with the fishing rod of the invention, the clutch of the reel can be readily operated in the palming operation. In addition, the fishing rod of the invention is free from the difficulty that the hand gripping the fishing rod is slipped; that is, the palming operation and the casting operation can be performed positively. Hence, the angler is able to operate the fishing rod for a long time without his hand getting tired nor having pain.

What is claimed is:

1. A fishing rod comprising:
   rod pipe defining a longitudinal axis;
   a handle provided on said rod pipe, said handle comprising
      a foregrip;
      a butt grip;
      a reel seat positioned on a top side between said foregrip and said butt grip, said reel seat adapted to mount a fishing reel on said rod pipe, said reel seat comprising a front reel leg mounting portion adjacent said foregrip and a rear reel leg mounting portion adjacent said butt grip, said front reel leg mounting portion defining a first inlet position for entering a front reel leg of the fishing reel, said rear reel leg mounting portion defining a second inlet position for entering a rear reel leg of the fishing reel; and
      a trigger portion projecting downwardly from a bottom side opposite to said reel seat and located substantially intermediate said first and second inlet positions with respect to said longitudinal axis;
   wherein the handle defines a substantially symmetrical width traverse to said longitudinal axis when viewed from said top side, said traverse width has its minimal dimension between said first inlet position and said trigger portion, and its maximum dimension at an inflated side portion provided outwardly in the vicinity of said second inlet position, and further said traverse width continuously and substantially symmetrically increases from said trigger portion to said inflated side portion along the longitudinal axis and symmetrically decreases from said inflated side portion toward an end of said butt grip portion opposite to said foregrip, to thereby allow an angler to cast a fishing line while palming said fishing rod and said fishing reel mounted on said reel seat with one hand.

2. A fishing rod according to claim 1, wherein said butt grip defines a recessed region recessed toward said longitudinal axis on said bottom side, for receiving the middle finger, the third finger and the little finger of the angler, and said traverse width continuously decreases from said inflated side portion to said recessed region of the butt grip.

3. The fishing rod according to claim 1, wherein said trigger portion is adapted to positively engage a finger of an angular, and said trigger portion is located opposite a midpoint of said reel seat along said longitudinal axis.

4. The fishing rod according to claim 3, wherein said midpoint is positioned to align with a clutch actuator provided on said fishing reel.

5. The fishing rod according to claim 3, wherein said trigger portion is integrally formed with said reel seat, said front reel leg mounting portion, and said rear reel leg mounting portion.

6. The fishing rod according to claim 1, wherein said butt grip is gradually smaller in diameter towards an end of said fishing rod opposite to said foregrip.

7. The fishing rod according to claim 1, in combination with said fishing reel, said fishing reel being a bait-casting reel having a spool rotating about a rotational axis transverse to said longitudinal axis, wherein said reel seat receives a mounting member of said fishing reel, said trigger portion being adapted to positively engage a finger of an angler and being substantially aligned with a clutch actuator provided on said fishing reel.

8. A fishing rod comprising:

a rod pipe defining a longitudinal axis;

a handle provided on said rod pipe, said handle comprising a foregrip;

a butt grip;

a reel seat positioned on a top side between said foregrip and said butt grip, said reel seat adapted to mount a fishing reel on said rod pipe, said reel seat comprising a front reel leg mounting portion adjacent said foregrip and a rear reel leg mounting portion adjacent said butt grip, said front reel leg mounting portion defining a first inlet position for entering a front reel leg of the fishing reel, said rear reel leg mounting portion defining a second inlet position for entering a rear reel leg of the fishing reel; and a trigger portion projecting downwardly from a bottom side opposite to said reel seat and located substantially intermediate said first and second inlet positions with respect to said longitudinal axis;

wherein the handle defines a substantially symmetrical width traverse to said longitudinal axis when viewed from said top side, said traverse width has its minimal dimension between said first inlet position and said trigger portion, and its maximum dimension at an inflated side portion provided outwardly in the vicinity of said second inlet position, and further said traverse width continuously and substantially symmetrically increases from said trigger portion to said inflated side portion along the longitudinal axis and symmetrically decreases from said inflated side portion toward an end of said butt grip portion opposite to said foregrip as well as said butt grip comprising a lower surface which substantially extends along said longitudinal direction, for receiving at least a middle, ring, and little fingers, to thereby allow an angler to cast a fishing line while palming said fishing rod and said fishing reel mounted on said reel seat with one hand.

* * * * *